United States Patent

[11] 3,590,655

[72] Inventors Robert C. Farrell;
John W. Skelley, both of Saginaw, Mich.
[21] Appl. No. 881,190
[22] Filed Dec. 1, 1969
[45] Patented July 6, 1971
[73] Assignee General Motors Corporation
Detroit, Mich.

[54] ENERGY-ABSORBING STEERING COLUMN
9 Claims, 4 Drawing Figs.
[52] U.S. Cl. .................................................. 74/492
[51] Int. Cl. .................................................. B62d 1/18
[50] Field of Search .............................. 74/492, 493

[56] References Cited
UNITED STATES PATENTS
3,457,800  7/1969  Toshida et al. ............... 74/492
3,461,740  8/1969  Tajima et al. ................. 74/492

Primary Examiner—Milton Kaufman
Attorneys—W. E. Finken and D. L. Ellis

ABSTRACT: An automotive vehicle energy-absorbing steering column assembly includes an energy-absorbing support jacket comprised of upper and lower telescopic sections having interposed therebetween a ball-type energy-absorbing deformer structure providing a first level of energy absorption for an initial amount of forward displacement of the steering wheel whereafter the upper section abuts a third section telescopically mounted on the lower section with a further ball-type structure therebetween so that continued displacement of the steering wheel forwardly of the vehicle is met with a second higher level of energy absorption.

PATENTED JUL-6 1971
3,590,655
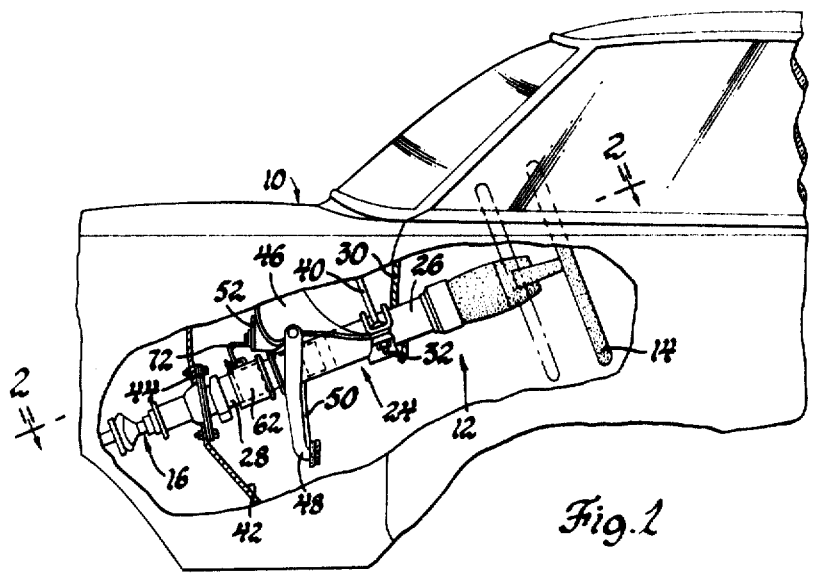
Fig.1
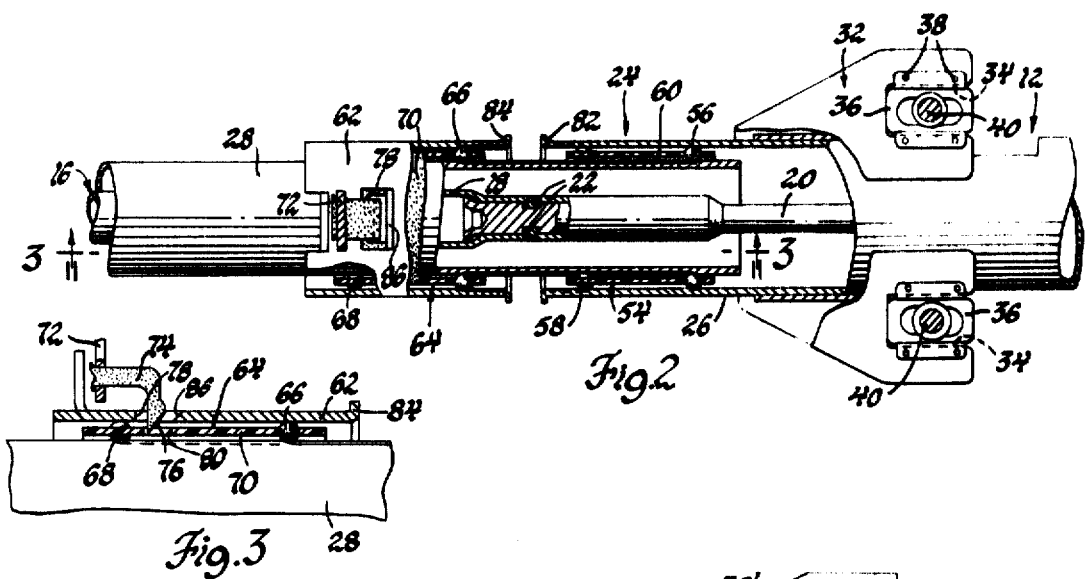
Fig.2
Fig.3
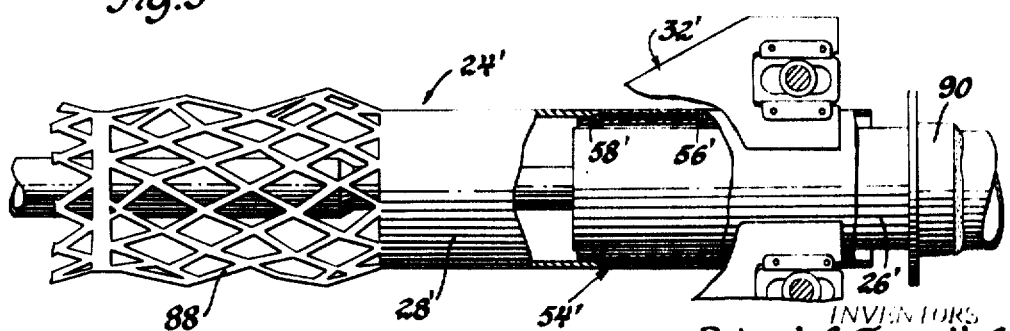
Fig.4
INVENTORS
Robert C. Farrell, &
BY John W. Skelley
D. L. Ellis
ATTORNEY 3,590,655

ENERGY-ABSORBING STEERING COLUMN

This invention relates to energy absorption constructions and more particularly to energy-absorbing steering column assemblies for automotive vehicles.

This invention is directed to providing improvements for energy-absorbing steering columns in respect of efficiently controlling the level of energy absorption at a uniform level during the full excursion of collapsing movement within the column under forces applied to the vehicle steering wheel. The kinetics of such columns, including the structural inertia of and friction between the various parts thereof as well as the effect of breakaway shear-type structures holding normal relation in the column may give rise to an initial very brief peak load, whereafter during collapse the loading falls off to a lower value with consequent lower level of energy absorption therein. It is desirable to reduce the difference between such loadings in the time history of collapse while achieving maximum energy absorption, but not exceeding a nominal maximum load to be sustained in the column assembly. It is sometimes also desirable, for other reasons than the elimination of an initial peak load, to have the capability of gradually or otherwise increasing the load level in the column during the time history of collapse from an initial low level to a final higher level of load.

It is accordingly the primary object of this invention to provide energy-absorbing construction for steering columns and the like wherein the time history of column displacement or collapse includes a first stage or level of load at the completion of which there is met a different higher level of load.

Another object of the invention is to provide energy-absorbing construction for steering columns and the like wherein a first energy absorber unit is operative in an initial stage of column loading under forces applied to the vehicle steering wheel to provide a first reduced level of energy absorption, which may be controlled to be of relatively short duration corresponding only with what would otherwise be a normal period of peak loading, whereafter continued column displacement is met with an increased level of energy absorption arising from the operation of a second energy absorbing unit.

A further object of the invention is to construct an energy-absorbing steering column support jacket or like energy-absorbing structure with telescopically related sections including first and second energy absorber units operative sequentially during initial and later stages of column collapse to provide a predetermined time history of energy absorption during the full telescoping excursion thereof.

A further object of the invention is to incorporate within such an energy-absorbing structure a first energy absorber unit comprised of ball-type deformer rolling bodies operative during an initial stage of displacement between telescoping portions of the construction whereafter abutment means between such portions engage to bring into operation during continued such displacement a second energy-absorbing unit such as a further unit of ball-type deformer bodies, a corrugated tube section subject to accordionlike collapse, or other energy-absorbing unit.

Yet another object of the invention is to provide energy-absorbing steering column apparatus including an energy-absorbing support jacket constructed of upper and lower telescopically related jacket sections interengaged by a deformer ball-type of energy-absorbing unit operative during an initial stage of downward telescoping of the upper section under forces applied to the vehicle steering wheel to provide a first reduced level of energy absorption during a predetermined amount of such displacement, whereafter the upper section engages through an abutment conformation thereon with a further telescopically related tube and ball-type energy-absorbing deformer unit on the lower section so that the upper section and further tube telescope as a unit over the lower section and the two energy-absorbing units operate conjointly to provide an increased level of column loading and energy absorption over the remainder of the collapse or energy-absorbing excursion of the column.

These and other objects, features and advantages of the invention will be readily apparent from the following specification and from the drawings wherein:

FIG. 1 is a fragmentary partially broken-away elevational view of an automotive vehicle body including steering column apparatus incorporating energy-absorbing construction according to this invention;

FIG. 2 is an enlarged partially broken-away view taken generally along the plane indicated by lines 2-2 of FIG. 1;

FIG. 3 is a sectional view taken generally along the plane indicated by lines 3-3 of FIG. 2; and FIG. 4 is a view similar to FIG. 2 showing a modified form of the invention.

Referring now particularly to FIG. 1 of the drawings, an energy-absorbing construction according to the present invention is specifically disclosed for vehicle passenger injury protection in an automotive vehicle body designated generally as 10, including a steering column assembly 12 extending from the vehicle steering gear, not shown, at its one end to within the vehicle passenger compartment to mount at its other end a steering wheel 14.

As best shown in FIG. 2, a steering shaft 16 for operatively connecting the steering wheel 14 with the steering gear includes a pair of telescopically and nonrotatably related sections 18 and 20 adapted upon the application thereto of sufficient axial thrust to telescope in the direction of the applied thrust. The sections 18 and 20 are releasably held in the normal operating relation shown by a plurality of injection-molded plastic shearpins 22 subject to fracture under predetermined axial load on the sections. The steering shaft 16 is generally conventionally rotatably supported for normal operation of the vehicle steering gear by a surrounding generally tubular support jacket assembly 24 incorporating the energy-absorbing construction of the present invention.

Such jacket assembly basically includes a pair of upper and lower telescopically related cylindrical jacket sections 26 and 28. By means to be described, such sections are joined rigidly to provide for firm association for proper support of the steering shaft within the vehicle yet are subject to controlled collapse and absorption of the energy of forces applied to either the steering wheel 14 or to the lower end of the steering column.

Adjacent the steering wheel 14, section 26 is releasably held on a vertical wall portion 30 of the conventional vehicle instrument panel structure by a one-way shearable bracket assembly including a generally U-shaped bracket member 32 welded or otherwise fixed to section 26. The bracket member is provided with open-ended slots 34 receiving therein a pair of mounting capsules 36 having pairs of side flanges embracing the bracket and releasably secured thereto by a series of plastic shearpins 38 in situ injection molded between such flanges and the bracket. Hanger bolts 40 depend from the vehicle cowl structure and project through apertures in capsule 36 to receive nuts bearing on the underside of the capsules and threadably operative to firmly support the bracket and steering column support jacket 24 in the vehicle. Upon the application of forward axial thrust to section 26 under forces applied to steering wheel 14 sufficient to shear the pins 38, the bracket member may move forwardly out of the capsules for release of the section from the instrument panel. Upon rearward axial thrust from section 26 however, there is met the reaction of bolts 40 which prevent rearward displacement of the section from the instrument panel.

Section 28 is fixedly secured to the firewall structure 42 of body 10 by an anchorplate assembly 44 operative to prevent movement of such section in either axial direction under forces applied thereto from the steering gear or from the steering wheel 14.

Structurally associated with the wall portion 30 and bolts 40 is one end portion of the usual pedal support bracket 46 which extends downwardly from welded or like attachment to the vehicle cowl structure to assist in the structural support of the steering column as well as to mount the various vehicle control pedals including a clutch pedal 48 at one side of the column, and the brake pedal 50 at the other side thereof. Such bracket includes a forward bracket portion 52 for a purpose later to appear.

With particular reference to FIG. 2, support jacket sections 26 and 28 are firmly joined by an energy-absorbing unit which may be generally characterized as a ball-type deformer and energy-absorbing structure designated generally as 54. Such unit corresponds identically with the disclosure of the U.S. Pat. to White No. 3,392,599 issued July 16, 1968 and assigned to the assignee of the present invention. Reference may be had to that patent for a detailed discussion of the characteristics and structure of unit 54 but generally the same comprises a plurality of deformer balls arranged in at least two axially spaced annular rows 56 and 58, each of such balls being rollably held captive in a circular aperture provided in a plastic or like sleeve 60 disposed between the jacket sections. Balls 56 and 58 are received between the walls of the sections with a predetermined interference fit and are of such an elevated value of material hardness relative to the material hardness of either or both sections 26 and 28 as to be operative to roll over the walls thereof during forced telescoping movement of the sections as a result of the application of axial force thereto from either the steering gear or the steering wheel 14. As the balls 56 and 58 roll as a unit with sleeve 60 during such telescoping, the balls cause predetermined amounts of energy absorption arising from the localized plastic strain deformation or grooving caused in the walls of the sections.

Referring also to FIG. 3, there is received over section 28 in spaced relation below section 26 a further cylindrical member 62. Provided again between this member and section 28, is a further or second energy-absorbing unit. In the present embodiment, this unit again comprises a ball-type deformer and energy-absorbing construction identical in most respects to that just described for energy-absorbing unit 54. The second unit, designated generally as 64, comprises two axially spaced rows 66 and 68 of deformer balls again placed with interference fit between section 28 and member 62 and received within individual apertures of a sleeve 70. When mounted in the vehicle body 10, the member 62 and energy-absorbing unit 64 are disposed in relation to bracket portion 52 so that a restraining arm 72, extending downwardly from the bracket portion, mounts a restraining pawl 74 of strong plastic or like construction having a beveled end 76 thereof received within aperture 78 of member 62 and a similar aperture 80 in the sleeve 70.

Energy absorber units 54 and 64 are constructed to provide different levels of energy absorption or load-creating resistance to telescoping movement within support jacket 24. Specifically, energy-absorbing unit 54 is constructed to impart a predetermined level of load and energy absorption between sections 26 and 28, while energy absorber unit 64 provides predeterminately higher level of energy absorption between member 62 and section 28. This is conveniently done within the teachings of the White patent by a number of methods, but preferably it is done by placing the balls 56 and 58 with a predetermined interference fit between its mating members and by disposing balls 66 and 68 with a predeterminately higher interference fit between its mating members.

It will be noted that there is an axial gap between the lower end of section 26 and the upper end of member 62. Flanges 82 and 84 are provided thereon to form an abutment means for a purpose now to be described. In operation, and assuming first a downwardly applied force on steering wheel 14 sufficient to cause shearing of the various shear structures and telescoping of steering shaft 16 and column collapse and energy absorption within unit 54, initial downward displacement of section 26 telescopically over the firewall-held section 28 causes balls 56 and 58 to impart energy absorption by plastic deformation in these two sections. This occurs to provide a first lower level of loading in steering column 12 selected at a value as to provide for an acceptable loading at the steering wheel 14 during the initial stage or portion of the collapse time history, which may involve additive loadings from initial resistance to fracture of shearpins 22, initial frictional resistance in the telescoping and breakaway parts, etc. At the completion of this initial stage, section 26 has telescoped over section 28 the distance provided between flanges 82 and 84 whereupon such flanges engage and abut the downwardly displacing section 26 with member 62. At this point, continued downward telescoping of section 26 carries with it the member 62 thereby bringing into operation the second energy-absorbing unit 64.

The load-creating resistance and energy absorption provided by the additional unit 64 then creates an additive contribution to that imposed by unit 54; i.e., all four rows of balls 56, 58, 66 and 68 are operative to roll and provide plastic strain grooving in the walls of section 26 and member 62 as the latter telescope over section 28, which also receives grooves. It will thus be appreciated that a second or higher level of energy absorption may be provided for the remainder of the time history of collapse in the column following the engagement of the abutment flanges 82 and 84. Thus, having accomplished an initial lower value of energy absorption in unit 54 to avoid a high-peak load, a later higher load may obtain in the column from the contribution of both units to achieve maximum energy absorption through the greatest portion of displacement, or any portion thereof which is desired by proper selection of the spacing of member 62.

The various members in the support jacket assembly may be assembled by first disposing member 62 and energy absorber unit 64 on the upper end of section 28 and, with the use of a guide fixture, forcibly telescoping the subassembly of the member 62 and unit 64 in fixed relation downwardly over the section 28 to the position shown. The assembly operation will impart a plurality of grooves in the outer wall of section 28 while the energy absorber unit 64 is held in fixed relation in member 62, thereby occasioning an extent of localized plastic deformation in the inner wall of such member. However, during the collapse sequence above described, the unit 64 of balls 66 and 68 are operative to efficiently further roll over the wall of section 28 as well as over the wall of member 62 until it enters section 26 to deform its wall. It is of course to be appreciated that the various balls 56, 58, 66 and 68 are rotatably misaligned around section 28 in a staggered relation so that no two balls travel axially thereon in the same path. It will be appreciated that during the collapse sequence above described, the two energy absorber units 54 and 64 once having moved closer together to the point of abutment of flanges 82 and 84, thereafter remain in fixed spaced relation axially of section 28 and do not interfere with each other during the later final stage of collapse to alter operation.

During the described collapsed sequence, the pickup of member 62 by section 26 to occasion conjoint telescoping thereof is not resisted by pawl 74 since a cam edge 86 of aperture 78 engages the cam-shaped end 76 of the pawl to force it resiliently upwardly out of aperture 78 and 80 thereby permitting full telescoping collapse within the support jacket. However, pawl 74 is preferably arranged as shown to hold member 62 and energy absorber unit 64 against upward movement during the opposite type of column displacement occasioned by displacement of the vehicle steering gear and deformation of the firewall 42. In these conditions, section 26 is of course held stationary through reaction of support bracket 32 and the rearward displacement of section 28 is operative to cause energy absorption in energy absorption unit 54 similar to that just described for forward collapse. So that any subsequent forward collapse occasioned by forces on steering wheel 14 may meet with the successive different levels of energy absorption described above, the pawl 74 operates during the rearward collapse to hold member 62 and unit 64 in the relationship shown wherein flanges 82 and 84 are held spaced apart. Thus, the end 76 of the pawl engages the lower ends of apertures 78 and 80 to hold these parts and accordingly the balls 66 and 68 merely skid over the section 28.

This skidding also provides increased resistance to the rearward displacement of section 28.

In FIG. 4, there is shown a modification of the present invention wherein the support jacket designated generally as 24' again includes upper and lower sections 26' and 28' such as in the first embodiment but differing therefrom in respect of the interchange of smaller and larger diameters between upper and lower sections. Again, an energy absorber unit 54' may be interposed between these sections to provide a first reduced level of energy absorption during initial telescoping movement between the sections. Rather than having the releasable bracket assembly fixed to the upper section, such a bracket assembly 32' is welded to the lower section 28'.

The second absorber unit comprises an annularly corrugated energy-absorbing integral structural portion 88 of section 28' constructed of a meshlike network of interconnected strip elements similar to that disclosed in U.S. Pat. to Wight et al. No. 3,373,629 issued Mar. 19, 1968. An abutment collar 90 is welded or otherwise fixed to upper section 26' in assembled spaced relation to the upper portion of section 28'. As indicated in the first embodiment, energy-absorbing unit 54' may be constructed to provide a predetermined level of energy absorption and load imposition during initial collapse, whereafter, in this embodiment, the energy-absorbing portion 88 takes over completely to individually provide a higher level of energy absorption at a value selected by use of the structural expedients of material, stock thickness, etc., described in the Wight et al. patent.

In operation, downward telescoping movement arising from forces applied to the steering wheel 14 initially causes energy-absorbing unit 54 to cause plastic strain grooving in the upper section 26' and in the upper portion of section 28' at the selected level of load until the flange of abutment collar 90 engages the end of section 28'. At this point, the two sections are abutted against further relative movement therebetween thereby eliminating operation of unit 54' so that the downwardly applied loads are transferred directly to energy-absorbing portion 88 for energy absorption therein at the selected higher level.

In a rearward collapse of the column with rearward displacement of firewall 42, the reaction at bracket 32' dictates that all energy absorption will arise from crushing of energy absorbing portion 88 of section 28'.

It is to be appreciated that various structural alternatives are available for substitution in place of the specific deformer units within the herein disclosed concept of successively operating the two energy-absorbing units, either alone or in combination in the final stage of collapse. Further, it will be apparent that the initial force loadings in the energy-absorbing construction may be selected to be of a higher value than that of the second stage of collapse rather than lower. It will also be appreciated that the specific arrangement of the telescoping parts of support jacket 24 or any similar energy absorber may be altered from the embodiments shown by reversal of inner and outer parts and corresponding changes in the abutment flanges therebetween.

Having specifically described two illustrative embodiments of the invention, what I claim as the invention is:

1. In energy-absorbing steering column apparatus for automotive vehicles including a telescopic steering shaft adapted for operative connection between the steering gear of the vehicle and a manual steering instrumentality, and support jacket means mountable on the vehicle and rotatably supporting said shaft, the improvement comprising, said jacket means being constructed of telescopically related upper and lower members, the upper of said members being adapted to telescope relative to the lower of said members upon forces being applied to said instrumentality downwardly toward said lower section, first energy-absorbing means in said jacket means and operative during an initial stage of said downward telescoping movement between said members to provide a first level of controlled resistance thereto, second energy-absorbing means carried by said jacket means, and abutment means engageable upon completion of said first stage of downward telescoping movement to connect said upper member in force-transferring relation with said second energy-absorbing means such that the latter is responsive to continued downwardly applied forces on said manual instrumentality to provide a second level of controlled resistance to downward displacement of said upper member following said first stage of movement thereof.

2. The improvement recited in claim 1 wherein said abutment means are engageable to connect said upper member in force-transferring relation through both said first and second energy-absorbing means so that both thereof contribute to said second level of resistance.

3. In energy-absorbing steering column apparatus for automotive vehicles and including a telescopic steering shaft adapted for operative connection between the steering gear of the vehicle and a manual steering instrumentality, and a support jacket means mountable on the vehicle and rotatably supporting said shaft, the improvement comprising, said jacket means being constructed of telescopically related upper and lower members, the upper of said members being adapted to telescope relative to the lower of said members upon forces being applied to said instrumentality downwardly toward said lower member, spaced annular rows of deformer rolling bodies interposed with interference fit between said members operative to roll thereover during an initial stage of said downward telescoping movement between said members and to effect predetermined plastic strain grooving therein during such movement to provide a first level of controlled resistance thereto, a second energy-absorbing means carried by said jacket means, and abutment means engageable upon completion of said first stage of downward telescoping movement to connect said upper member in force-transferring relation with said second energy-absorbing means such that the latter is responsive to continued downwardly applied force on said manual instrumentality to provide a second level of controlled resistance to downward displacement of said upper member following said first stage of movement thereof.

4. The improvement recited in claim 3 wherein said abutment means are engageable to connect said upper member in force-transferring relation through both said first and second energy-absorbing means so that both thereof contribute to said second level of resistance.

5. The improvement recited in claim 3 wherein said second energy-absorbing means comprises a portion of said lower member constructed in annularly corrugated manner to be subject to accordionlike radial expansion and axial shortening under said forces, said abutment means being adapted to connect said upper member directly with said lower member.

6. The improvement recited in claim 3 wherein said second energy-absorbing means comprises a second set of spaced annular rows of deformer rolling bodies interposed with interference fit between said lower member and a further member received over said lower member, said abutment means being adapted to connect said upper member with said further member for conjoint telescoping movement thereof relative to said lower member following said first stage of movement.

7. The improvement recited in claim 1 further including one-way releasable bracket means fixed to said upper member and adapted for attachment within the vehicle in a manner permitting said downward telescoping movement thereof but preventing upward movement thereof, at least one of said energy-absorbing means being operative for controlled resistance to upward movement of said lower member against the reaction provided by said bracket means.

8. An energy absorber comprising first tube means, second tube means telescopically related with said first tube means, at least one annular row of deformer rolling bodies interposed with interference fit between said first and second tube means and operative to roll thereover during an initial stage of telescoping movement between said tube means in one direction to effect predetermined plastic strain grooving therein during such movement providing a first level of energy absorption, third tube means telescopically related with said second tube means, at least one annular row of deformer rolling bodies interposed with interference fit between said second and third tube means operative to roll thereover during telescoping movement therebetween to effect predetermined plastic strain grooving therein, and abutment means on said first and said third tube means engageable following completion of said first stage of telescoping movement of said first tube means to connect said first and third tube means for conjoint telescoping movement relative to said second tube means and conjoint rolling of the first and the last mentioned rows of deformer bodies so that continued telescoping movement of said first tube means in said one direction occurs with a second level of energy absorption effected by both said first and last mentioned rows of deformer bodies.

9. In energy-absorbing steering column apparatus for automotive vehicles and including a telescopic steering shaft adapted for operative connection between the steering gear of the vehicle and a manual steering instrumentality, and a support jacket mountable on the vehicle and rotatably supporting said shaft, the improvement comprising, said jacket being constructed of telescopically related upper and lower tubes, the upper of said tubes being adapted to telescope relative to the lower thereof upon forces being applied to said instrumentality downwardly toward said lower tube, one-way releasable bracket means fixed to said upper tube and adapted to permit said downward telescoping movement thereof but prevent upward movement thereof, at least two axially spaced annular rows of deformer balls interposed with interference fit between said tubes and operative to roll thereover during an initial stage of said downward telescoping movement of said upper tube to effect predetermined plastic strain grooving in said tubes providing a first level of controlled resistance to such telescoping movement, a third tube received telescopically over said lower tube below said upper tube, at least two axially spaced annular rows of deformer balls interposed with interference fit between said lower and third tubes operative to roll thereover during telescoping movement therebetween to effect predetermined plastic strain grooving therein, and abutment flanges means on said upper and said third tubes engageable upon completion of said first stage of downward telescoping movement of said upper tube to connect said upper and third tubes for conjoint telescoping movement downwardly relative to said second tube such that both the first and the last mentioned spaced rows of deformer balls are responsive to such continued downward telescoping movement to provide a second higher level of controlled resistance to such movement.